US008594321B2

(12) United States Patent
Mayer et al.

(10) Patent No.: US 8,594,321 B2
(45) Date of Patent: Nov. 26, 2013

(54) APPARATUS AND METHOD FOR OPERATING A SYMMETRIC CIPHER ENGINE IN CIPHER-BLOCK CHAINING MODE

(75) Inventors: Ulrich Mayer, Schoenbuch (DE); Thomas Koehler, Holzgerlingen (DE); Bernd Nerz, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 692 days.

(21) Appl. No.: 12/257,439

(22) Filed: Oct. 24, 2008

(65) Prior Publication Data

US 2009/0110189 A1 Apr. 30, 2009

(30) Foreign Application Priority Data

Oct. 26, 2007 (EP) ..................................... 07119375

(51) Int. Cl.
*H04K 1/00* (2006.01)
(52) U.S. Cl.
USPC .......................................................... 380/29
(58) Field of Classification Search
USPC .................................................... 380/37, 29
See application file for complete search history.

(56) References Cited

U.S. PATENT DOCUMENTS

| 4,969,190 | A | * | 11/1990 | Takaragi et al. | 380/43 |
| 6,249,582 | B1 | * | 6/2001 | Gilley | 380/28 |
| 7,170,800 | B2 | * | 1/2007 | Chiueh et al. | 365/194 |
| 7,200,226 | B2 | * | 4/2007 | Bace | 380/37 |
| 7,362,859 | B1 | * | 4/2008 | Robertson et al. | 380/37 |
| 7,885,405 | B1 | * | 2/2011 | Bong | 380/37 |
| 2002/0037079 | A1 | * | 3/2002 | Duval | 380/37 |
| 2003/0223581 | A1 | * | 12/2003 | Hanounik | 380/37 |
| 2005/0053232 | A1 | * | 3/2005 | Bace | 380/29 |
| 2009/0110189 | A1 | * | 4/2009 | Mayer et al. | 380/29 |
| 2009/0228686 | A1 | * | 9/2009 | Koenck et al. | 712/32 |

OTHER PUBLICATIONS

"The IBM eServer z990 microprocessor" by T. J. Siegel (2004); pp. 295-309 of IBM J. Res. & Dev. vol. 48; originally downloaded from http://citeseerx.ist.psu.edu/viewdoc/summary?doi=10.1.1.135. 5998.*
NPL "Protecting Message Integrity" (1999) by John J. G. Savard; 7 pages; converted to PDF originally from http://www.quadibloc.com/crypto/co040603.htm.*
McGhan, Harlan, "Niagara 2 Opens the Floodgates." Microprocessor Report, Nov. 6, 2006, pp. 1-9 (reprint), Reed Electronics Group, Scottsdale, AZ.
T. W. Arnold, "Cryptographic system enhancements for the IBM System z9." IBM J. Res. & Dev. vol. 51 No. 1/2 Jan./Mar. 2007, pp. 87-102.

* cited by examiner

*Primary Examiner* — Peter Shaw
*Assistant Examiner* — Dao Ho
(74) *Attorney, Agent, or Firm* — The Steadman Law Firm PLLC; Cynthia G. Seal; Katherine S. Brown

(57) ABSTRACT

An apparatus is disclosed for operating a symmetric cipher engine (SCE) in cipher-block chaining (CBC) mode. The apparatus includes a crypto operation hardware including the SCE and an XOR stage, an apparatus for storing a chaining value including a state register of the SCE, an input latch supplying the crypto operation hardware with data, and an output latch. The data may be reordered for decipher operation. Furthermore, a method is disclosed for operating a SCE in CBC mode, wherein the method involves a crypto operation hardware that includes the SCE and an XOR stage supplied with data. The method also may include using a state register of the SCE to apply a chaining value. The method further may comprise reordering data supplied to the crypto operation hardware for decipher operation.

8 Claims, 3 Drawing Sheets

(state of the art)

APPARATUS AND METHOD FOR OPERATING A SYMMETRIC CIPHER ENGINE IN CIPHER-BLOCK CHAINING MODE

RELATED APPLICATION

This application claims priority under 35 U.S.C. §119 to European Patent Application No. 07119375.9 filed Oct. 26, 2007, the entire text of which is specifically incorporated by reference herein.

BACKGROUND OF THE INVENTION

The various embodiments described herein relate to cipher and decipher operations within microprocessors.

In cryptography, a block cipher operates on blocks of fixed length (e.g., 64 bits or 128 bits). Because messages may be of any length, and because encrypting the same plaintext under the same key always produces the same output, i.e. ciphertext, several modes of operation have been developed that allow block ciphers to provide confidentiality for messages of arbitrary length.

In the cipher-block chaining (CBC) mode of cipher operation, each block of plaintext is XORed with the previous ciphertext block before being encrypted. Accordingly, each ciphertext block is dependent on all plaintext blocks processed up to that point. Encrypted information is transmitted via a chaining value that is updated with each ciphertext block. The same principle is used in decipher operation, wherein the roles of plaintext and ciphertext are interchanged.

In FIG. 1, a scheme of CBC is shown that depicts the data flow of CBC mode for symmetric ciphers. Input data 01 in a symmetric cipher engine 02 may comprise both a chaining value 03 and input text, which is plaintext (PT) for a cipher operation (FIG. 1*a*) and ciphertext (CT) for a decipher operation (FIG. 1*b*). To make each message unique, an initial chaining value 04 may be used to initiate the process for the first real block. FIG. 1 also includes XOR stages 05 (indicated by "=1" components) for XORing data in accordance with the CBC mode.

In FIG. 2, a hardware implementation 06 of CBC according to the state of the art is provided. The hardware implementation 06 may be used for both cipher operation and decipher operation. An input data buffer 07 and an output data buffer 08 (e.g., working according to a first in, first out (FIFO) principle), allow successive (i.e., back-to-back) operations without unnecessary wait cycles. Consequently, software can fill the input data buffer 07 asynchronously to the cipher operation. The input data 01 (FIG. 1) is supplied to a crypto operation hardware 09. The crypto operation hardware 09 includes a symmetric cipher engine (SCE) 02 and XOR stages 05 (indicated by "=1" components). A key 11 is used by the SCE 02 during processing.

At least for cipher operation (FIG. 1*a*), an initial chaining value (ICV) 04 is used for ciphering a first block of input data 01 (i.e., plaintext (PT)). For a subsequent block of input data 01, the crypto operation hardware 09 stores a ciphertext block processed from the previous block of input data for use as a chaining value 03 for ciphering the subsequent block. For decipher operation (FIG. 1*b*), an ICV 04 is used for deciphering a first block of input data 01 (i.e., ciphertext (CT)). For a subsequent block of input data 01, the crypto operation hardware 09 stores the previous block of input data 01 for the duration of one decipher operation for use as a chaining value 03 for deciphering the subsequent block.

To store the relevant data for use as a chaining value for cipher operation or for decipher operation, the crypto operation hardware 09 according to the state of the art comprises a dedicated chaining value register (CVR) 10. The width of the CVR 10 is equal to the width of a basic block of the relevant symmetric cipher algorithm. The CVR 10 is necessary according to the state of the art to store a chaining value for ciphering or deciphering. Specifically, for cipher operation the CVR 10 stores a chaining value to be XORed with a plaintext block of input data 01, and the result is processed by the SCE 02. For decipher operation the CVR 10 stores a chaining value that is XORed with a ciphertext block of input data 01 that has been processed by the SCE 02. While the CVR 10 is required for hardware implementation of CBC according to the state of the art, it is disadvantageous in that it requires area and power.

SUMMARY OF THE INVENTION

The objectives of the various embodiments described herein are to provide an apparatus with reduced area and power requirements for operating a symmetric cipher engine in CBC mode and to provide a method for operating a symmetric cipher engine in CBC mode that eliminates the necessity of a dedicated block-sized chaining value register (CVR).

A first aspect of the various embodiments described herein concerns an apparatus for operating a symmetric cipher engine (SCE) in CBC mode. The apparatus may include a crypto operation hardware including the SCE and an XOR stage; an apparatus for storing a chaining value including a state register of the SCE; an input latch supplying the crypto operation hardware with data, particularly with a key, an initial chaining value (ICV), input data such as plaintext (PT) to be ciphered or ciphertext (CT) to be deciphered, and the like; and an output latch.

Moreover, in said apparatus, said data is reordered for decipher operation. Using the state register of the SCE eliminates the dedicated CVR that is required to store the chaining value according to the state of the art. That is to say, according to the various embodiments described herein, a state register of the SCE may be used to store the chaining value.

According to an exemplary embodiment of said apparatus, at least for cipher operation it is possible to eliminate a dedicated CVR by using a state register of the SCE. When processing a first block of input data, the ICV may be written to the state register, and in the next cycle the first block of input data may be XORed with the ICV in order to be set up for the operation on the first block of input data. The next block of input data to be processed may be XORed with the chaining value from the first block of input data (which has been stored in the state register) in order to be set up for the operation on the next block. More generally, for a following block of input data to be processed (i.e., for a block of input data other than the first block of input data), the following block may be XORed with the chaining value from the previous block of input data (which as been stored in the state register) in order to be set up for the operation on the following block.

The same mechanism is inadequate for decipher operation, since the input data block of the current decipher operation needs to be stored until the current data block has been processed so that the input data block may be used as a chaining value for the next decipher operation. Thus, for decipher operation the dedicated chaining value register required according to the state of the art may be removed by changing the order in which the data is sent to the crypto operation hardware—i.e., by using a specified ordering process.

The ordering process according to which the crypto operation hardware receives the different types of data for decipher operation may comprise a startup procedure, wherein a key, a first block of ciphertext to be deciphered, and an ICV are supplied to the crypto operation hardware, followed by at least one operation procedure, in which the next block of ciphertext to be deciphered followed by the last block of ciphertext deciphered are supplied to the crypto operation hardware. In order to perform the CBC operation correctly, the key, input data, and chaining values must be supplied to the crypto operation hardware. By following such ordering process, a previous block of ciphertext may be adequately provided as the chaining value for use in conjunction with a next block of ciphertext to be deciphered, and consequently the dedicated CVR that is required according to the state of the art may be eliminated. Such ordering process may eliminate a dedicated chaining value register for even cipher algorithms with large block sizes (e.g., 128 bits in the case of Advanced Encryption Standard (AES)) for decipher operation as well as for cipher operation. It is important to note that during the startup procedure of the ordering process, the key, the first block of ciphertext, and the ICV may be received in any order.

According to an exemplary embodiment of the apparatus, millicode may be used to transport ciphertext to the state register of the SCE. Millicode is internal code that may be used to provide transparency from an instruction set architecture point of view. Millicode may store the previous block of ciphertext (i.e., the chaining value) in a millicode general purpose register (MGR).

The apparatus may be part of a microprocessor, e.g., an adapted microprocessor as described in Slegel et al.: "The IBM eServer z990 Microprocessor," IBM J. Res. & Dev., Vol. 48 No. 3/4, May/July 2004. By modifying the hardware and the millicode as described, the area for the chaining value register and the power it dissipates may be saved. In the event that the apparatus is part of a microprocessor, the AES cipher algorithm may be used, and AES is the cipher algorithm with the largest block size (128 bits). In such an example microprocessor, the various embodiments described herein may save 128 data latches and 16 parity latches.

A second aspect of the various embodiments described herein concerns a method for operating a SCE in CBC mode, the SCE being part of a crypto operation hardware comprising an XOR stage supplied with data, such as a key, input data in the form of plaintext or ciphertext blocks, and an ICV. Said method may comprise using a state register of the SCE to store a chaining value. Moreover, the method may comprise reordering data supplied to the crypto operation hardware for decipher operation. The method eliminates the dedicated CVR required by the state of the art by using a state register of the SCE.

According to an exemplary embodiment of said method, at least for cipher operation, when processing a first block of input data (i.e. a first block of plaintext), an ICV may be written to the state register, and in the next cycle the first block of input data may be XORed with the ICV in order to be set up for the operation on the first block. The next block of input data to be processed may be XORed with the chaining value from the first block of input data (which has been stored in the state register) in order to be set up for the operation on the next block. More generally, for a following block of input data to be processed, the following block may be XORed with the chaining value from the previous block of input data in order to be set up for the operation on the following block.

The same mechanism is inadequate for decipher operation, since the input data block of a current decipher operation needs to be stored until the current data block has been processed so that this input data block may be used as the chaining value for the next decipher operation. Thus, for decipher operation the dedicated chaining value register required according to the state of the art may be removed by changing the order in which the data is sent to the crypto operation hardware—i.e., by using a specified ordering process.

According to an exemplary embodiment of said method, the ordering process according to which the crypto operation hardware receives the different types of data for decipher operation may comprise a startup procedure, wherein a key, a first block of ciphertext to be deciphered, and an ICV are supplied to the crypto operation hardware, followed by at least one operation procedure, in which the next block of ciphertext to be deciphered followed by the last block of ciphertext deciphered are supplied to the crypto operation hardware. In order to perform the CBC operation correctly, the key, input data, and chaining values must be supplied to the crypto operation hardware. By following such ordering process, a previous block of ciphertext may be adequately provided as the chaining value for use in conjunction with a next block of ciphertext to be deciphered, and consequently the dedicated CVR that is required according to the state of the art may be eliminated. Such ordering process may eliminate a dedicated chaining value register for even cipher algorithms with large block sizes (e.g., 128 bits in the case of AES) for decipher operation as well as for cipher operation. It is important to note that during the startup procedure of the ordering process, the key, the first block of ciphertext, and the ICV may be received in any order.

According to another exemplary embodiment of said method, a millicode facility may be available in the example microprocessor described above to transport the ciphertext to the state register of the SCE, wherein millicode stores the previous block of ciphertext, i.e. the chaining value, in a millicode general purpose register (MGR).

In sum, the various embodiments described herein are advantageous over the state of the art in that they provide a more efficient implementation in terms of area and power of the CBC mode of symmetric cipher algorithms.

BRIEF DESCRIPTION OF THE DRAWINGS

The foregoing, together with other objects, features, and advantages of the various embodiments described herein, can be better appreciated with reference to the following specification, claims, and drawings, wherein:

DETAILED DESCRIPTION

Figure 3:
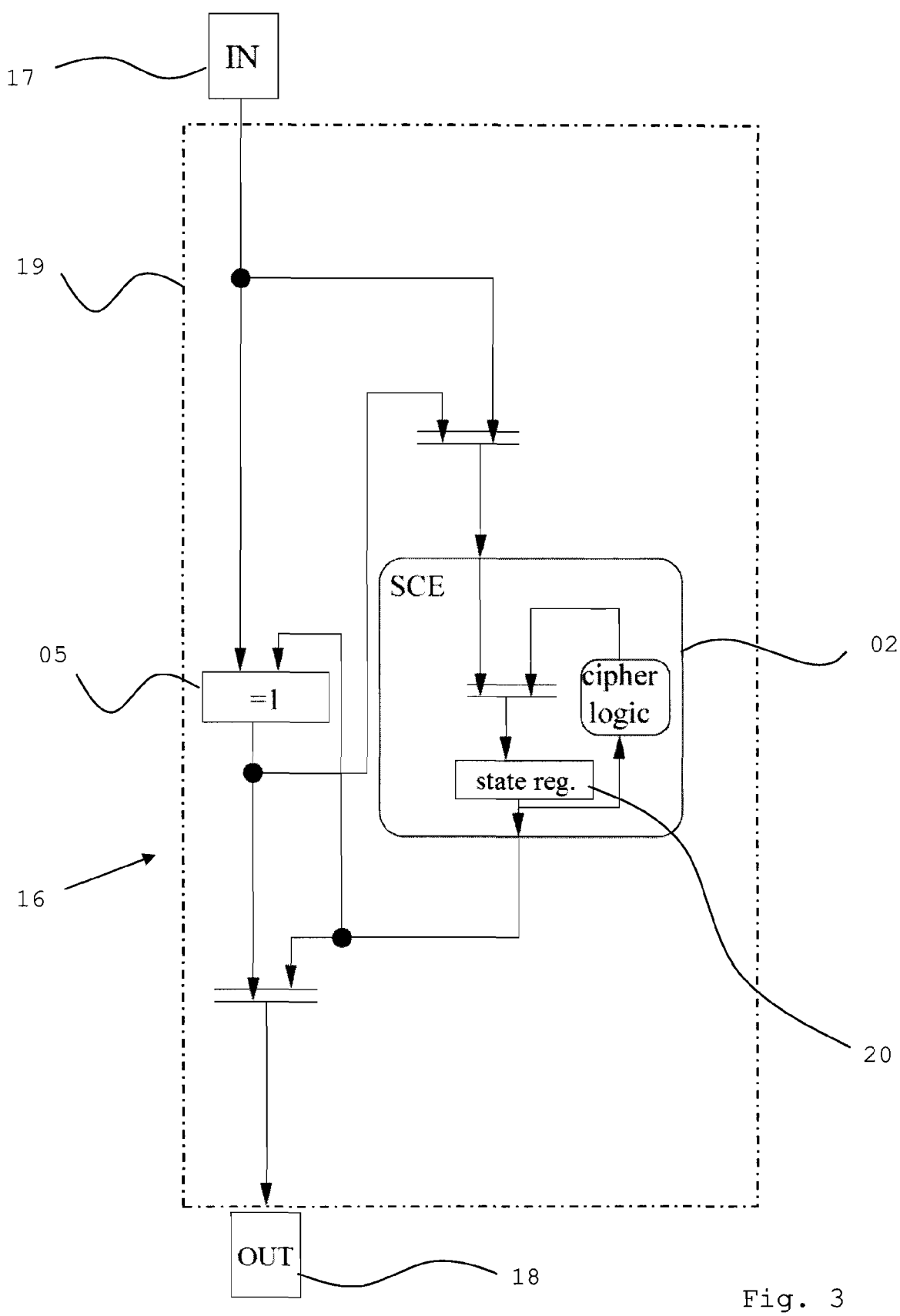
FIG. 3 illustrates a scheme of a hardware implementation of CBC according to an exemplary embodiment.

In FIG. 3, a hardware implementation 16 of CBC according to an exemplary embodiment is provided. The hardware implementation 16 may be used for both cipher operation and decipher operation. As is the case with the state of the art implementation, an input data buffer 17 and an output data buffer 18 (e.g., working according to a first in, first out (FIFO) principle) may be provided to allow successive (i.e., back-to-back) operations without unnecessary wait cycles. Consequently, software may fill the input data buffer 17 asynchronously to the cipher operation. The input data 01 (FIG. 1) may be supplied to a crypto operation hardware 19. The crypto operation hardware 19 may comprise a symmetric cipher engine (SCE) 02 and an XOR stage 05 (indicated by "=1" component).

Figures 1A, 1B:
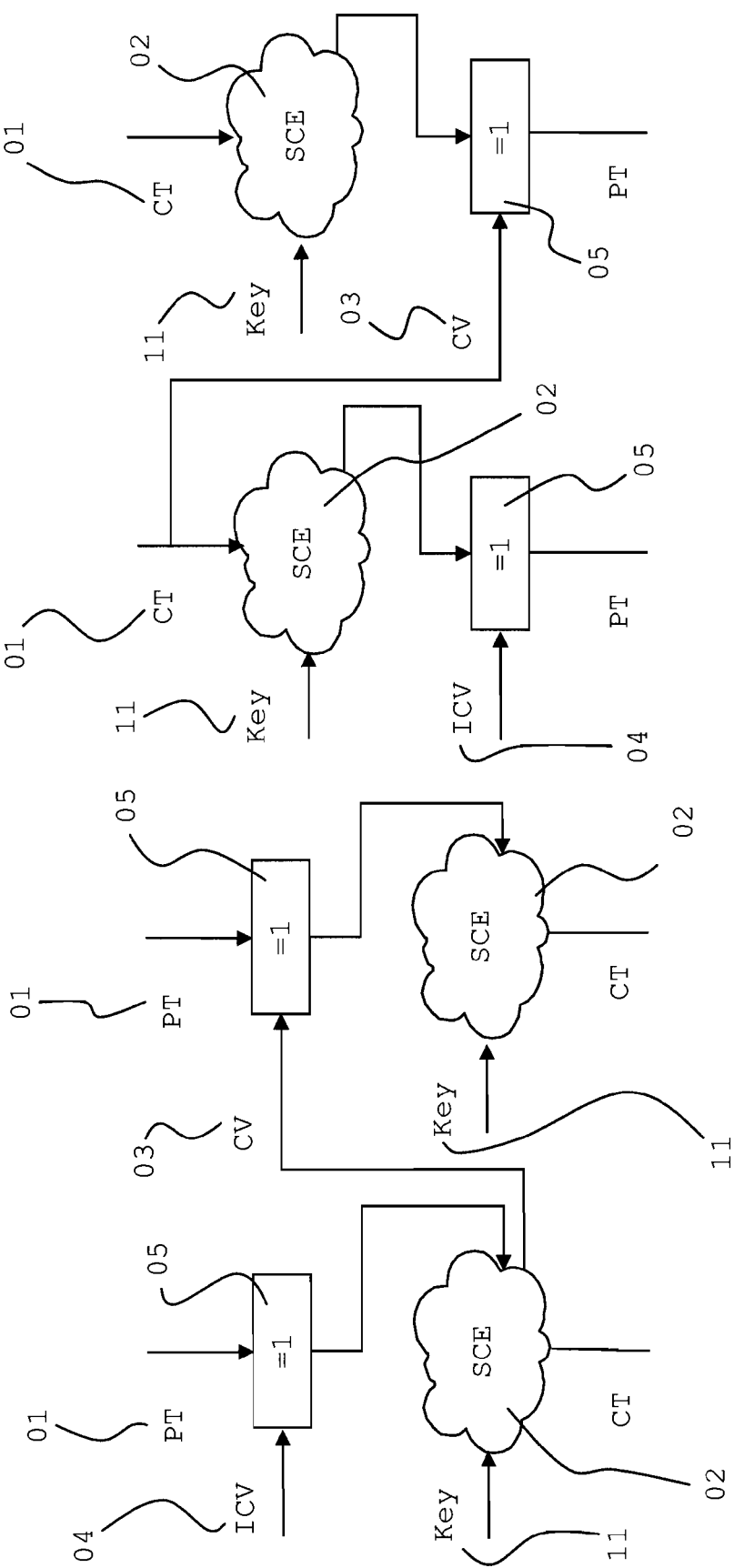
FIG. 1 illustrates a scheme of CBC for ciphering (FIG. 1a) and deciphering (FIG. 1b)
Figure 2:
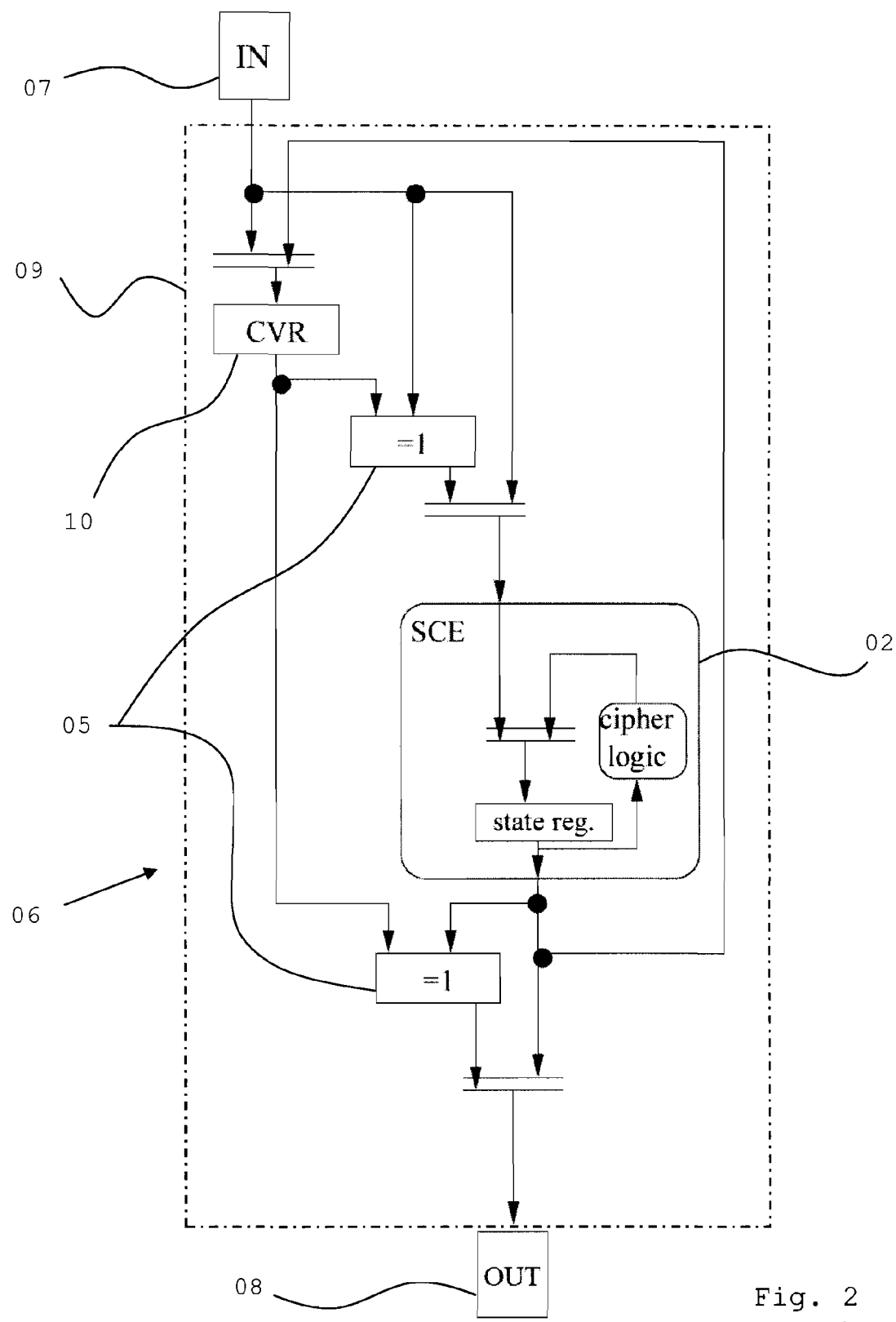
FIG. 2 illustrates a scheme of a hardware implementation of CBC according to the state of the art.

In accordance with an exemplary embodiment, at least for cipher operation, it is possible to eliminate the dedicated chaining value register 10 shown in FIG. 2 by using a state register 20 within the SCE 02. As depicted in FIG. 3, the state register 20 may be used in lieu of a chaining value register. When processing a first block of input data 01 (i.e., a first block of plaintext, as depicted in FIG. 1), an initial chaining value (ICV) 04 may be written to the state register 20, and in the next cycle the data may be XORed with the ICV via the XOR stage 05. The next block of input data to be processed may be XORed with the chaining value from the first block of input data (which has been stored in the state register) via the XOR stage 05 in order to be set up for the operation on the next block. More generally, for a following block of input data 01 to be processed (i.e., for a block of input data other than the first block of input data), the following block may be XORed with the chaining value from the previous block of input data (which has been stored in the state register) via the XOR stage 05 in order to be set up for the operation on the following block.

The same mechanism is inadequate for decipher operation, since the input data block 01 (i.e., a block of ciphertext, as depicted in FIG. 1) of a current decipher operation needs to be stored until the current data block has been processed so that this input data block may be used as the chaining value for the next decipher operation. Thus, for a decipher operation the dedicated CVR 10 required by the state of the art (FIG. 2) may be removed by changing the order in which the data is sent to the crypto operation hardware—i.e., by using a specified ordering process.

The order according to which the crypto operation hardware 09 (FIG. 2) receives the different types of data according to the state of the art is the following: the crypto operation hardware 09 receives a key 11 and an ICV 04 in any order, followed by ciphertext input data 01 in sequential order. An example order is provided below:

Example Order According to the State of the Art
Key
ICV
data1
data2
data3
...

As previously discussed, the order according to the state of the art requires a dedicated CVR.

In order to eliminate the dedicated CVR, the ordering process according to an exemplary embodiment may comprise a startup procedure, wherein a key 11, a first block of ciphertext input data 01 to be deciphered, and an ICV 04 are supplied to the crypto operation hardware 19, followed by at least one operation procedure, in which the next block of ciphertext input data 01 to be deciphered followed by the last block of ciphertext deciphered (to be used as a chaining value 03) are supplied to the crypto operation hardware 19. In order to perform the CBC operation correctly, the key 11, input data 01, and chaining values must be supplied to the crypto operation hardware 19. By following such ordering process, a previous block of ciphertext may be adequately provided as the chaining value for use in conjunction with a next block of ciphertext input data to be deciphered, and the dedicated CVR that is required according to the state of the art may be eliminated. Such ordering process may eliminate a dedicated CVR for even cipher algorithms with large block sizes (e.g., 128 bits in the case of AES).

In an exemplary embodiment, on a z990 microprocessor, as described in, e.g., Siegel et Al.: "The IBM eServer z990 microprocessor"; IBM J. Res. & Dev.; Vol. 48 No. 3/4; May/July 2004, millicode may store chaining values in millicode general purpose registers (MGRs). In order to perform the CBC operation correctly, the chaining values are re-sent to the crypto operation hardware 19. Thus, the order of the data sent to the crypto operation hardware 19 is modified in accordance with the ordering process described above. In the following order listing, ciphertext input data to be deciphered is labeled as "CT", while the ICV and previous blocks of ciphertext to be used as chaining values are labeled as "CV".

Modified Order According to an Exemplary Embodiment
Key
data1 CT
ICV CV
data2 CT
data1 CV
data3 CT
data2 CV
...

By modifying the hardware and the millicode as described, the area for the CVR 10 (FIG. 2) and the power it dissipates may be saved.

In the case of a z990 microprocessor, as known from Siegel et Al.: "The IBM eServer z990 Microprocessor"; IBM J. Res. & Dev.; Vol. 48 No. 3/4; May/July 2004, AES is the cipher algorithm with the largest block size (128 bit). For this microprocessor, the exemplary embodiment and other similar embodiments may save 128 data laches latches and 16 parity latches.

In sum, the various embodiments described herein provide a more efficient implementation in terms of power and area of the CBC mode of symmetric cipher algorithms.

While the various embodiments described herein have been described in detail, it is evident that many alternatives, modifications, and variations will be apparent to those skilled in the art in light of the foregoing description. It is therefore contemplated that the appended claims will embrace any such alternatives, modifications, and variations as falling within the true scope and spirit of the embodiments.

The invention claimed is:

1. An apparatus comprising:
   a crypto operation hardware including an XOR stage and a symmetric cipher engine having a block-sized state register, wherein said block-sized state register is configured for storing a chaining value;
   an input latch configured for supplying said crypto operation hardware with data wherein said data is reordered for decipher operation, and wherein an order according to which said crypto operation hardware receives said data for decipher operation comprises:
      a startup procedure, wherein a key, a first block of ciphertext to be deciphered, and an initial chaining value are supplied to said crypto operation hardware, and
      at least one operation procedure, in which the next block of ciphertext to be deciphered followed by the previous block of ciphertext deciphered are supplied to said crypto operation hardware; and
   an output latch configured for receiving output from said crypto operation hardware.

2. The apparatus according to claim 1, wherein:
   an initial chaining value is written to said block-sized state register when processing a first block of input data,
   said first block of input data is XORed with said initial chaining value in the next cycle, and the next block of input data is XORed with the chaining value from said first block of input data in order to be set up for the operation on said next block of input data.

3. The apparatus according to claim 2, wherein a following block of input data is XORed with the chaining value from the previous block of input data in order to be set up for the operation on said following block of input data.

4. The apparatus according to claim 1, wherein millicode is used to transport said chaining value to said block-sized state register, and wherein millicode stores said chaining value in a millicode general purpose register (MGR).

5. A method for operating a symmetric cipher engine in cipher-block chaining (CBC) mode, wherein said symmetric cipher engine is included in a crypto operation hardware, said method comprising:

using a block-sized state register of said symmetric cipher engine for storing a chaining value; and reordering data supplied to said crypto operation hardware for decipher operation, wherein said reordering comprises:

initiating a startup procedure, wherein a key, a first block of ciphertext to be deciphered, and an initial chaining value are supplied to said crypto operation hardware, and initiating at least one operation procedure, in which the next block of ciphertext to be deciphered followed by the previous block of ciphertext deciphered are supplied to said crypto operation hardware.

6. The method according to claim 5, said method further comprising:

writing to said block-sized state register an initial chaining value when processing a first block of input data;

XORing said first block of input data with said initial chaining value in the next cycle; and XORing the next block of input data with the chaining value from said first block of input data in order to be set up for the operation on said next block of input data.

7. The method according to claim 6, said method further comprising XORing a following block of input data with the chaining value from the previous block of input data in order to be set up for the operation on said following block of input data.

8. The method according to claim 5, wherein millicode is used to transport said chaining value to said block-sized state register, and wherein millicode stores said chaining value in a millicode general purpose register (MGR).

\* \* \* \* \*